Jan. 9, 1968  R. E. GALER  3,362,083
GASEOUS APPARATUS FOR COOLING PULVERULENT MATERIAL
Filed July 7, 1967  4 Sheets-Sheet 4

INVENTOR
RICHARD E. GALER
BY
ATTORNEYS

United States Patent Office 3,362,083
Patented Jan. 9, 1968

3,362,083
GASEOUS APPARATUS FOR COOLING
PULVERULENT MATERIAL
Richard E. Galer, Alpena, Mich., assignor to National
Gypsum Company, Buffalo, N.Y., a corporation of
Delaware
Filed July 7, 1967, Ser. No. 651,783
14 Claims. (Cl. 34—57)

ABSTRACT OF THE DISCLOSURE

This invention is directed to apparatus for processing substantially dry pulverulent material within a heat exchanging chamber. The pulverulent material, such as cement, is directed inwardly to a heat exchanger or cooling apparatus in which numerous baffles are arranged so that the in-flowing material follows a generally serpentine path to an outlet port. Circulation of the material around the baffles is maintained by in-flowing fluid pressure derived both by fluid pressure flow through a porous bottom appropriately placed within the chamber. The baffles are arranged to have a coolant material flow therethrough so that as the pulverulent material moves adjacent to the baffle surface cooling is provided.

---

This invention constitutes a continuation-in-part of an earlier filed application of this inventor and applicant, which application was filed in the United States Patent Office on Mar. 10, 1965, as Ser. No. 438,557 and which was then later allowed on Apr. 13, 1967, now abandoned.

This invention relates to apparatus particularly adapted for cooling pulverulent material both during manufacture and then prior to shipment.

The invention finds application in many fields but as an illustration of its use it will be described in relation to the manufacture of Portland cement. In such an invention the extremely finely divided particles, as the end-product is produced, are to hot for ready shipment when supplied from the grinding operation to various loading stations. This is due to several causes. First of all, in the grinding operation to produce the pulverulent material from the clinker substantial heat results from the conversion of mechanical energy to heat as the clinker is crushed and powdered. Next, the clinker is still very hot when crushed, ground or pulverized. Because of the pulverulent nature of the end-product, it is extremely difficult to dispose of this heat. It is the cause of one of the problems which has confronted the cement industry for many years. For marketing purposes it is important that there shall be available a relatively simple and yet efficient cooling device through the use of which the temperature can be readily reduced to a range approaching room temperature prior to product distribution for use.

As the finely divided solid particles of cement are delivered from the grinding mechanism by which the clinker is brought to practically a fluidized state, the particle temperature is quite high. This temperature is usually in a range of at least 200° F. to 250° F. Because of the fact that one end-product is pulverulent in nature and consists of such finely divided solids as to make it almost a fluidized mass. if attempts are made to ship or transport it in this state its very characteristics practically perclude any cooling by natural methods, except for volumes very close to the surface area of the container into which the medium is placed. In fact, experience has shown that, even following long periods of storage in extremely cold weather, the temperature of the stored product at any region removed more than a very few inches from the surface of the enclosing container frequently remains within about 5° F. of the temperature at which it was originally stored. This is undesirable for various reasons.

In the first place, the hot material is difficult for the worker to handle at the time it is mixed with water, as in the building industry or the road-making industry. Secondly, because of the fact that the product remains very hot when stored it is apparent that it tends to cause substantial heat or even steaming or boiling of the water with which it is mixed. This is what is known generally as the heat of hydration. The result is that much mixing water evaporates and the moisture content of the mixture is very much of a variable. It will be apparent that unless special efforts are made to compensate for the product temperature at the time of its mixture with water and aggregate the rate of final drying will be largely dependent upon the temperature of the product in the first instance. Since the temperature would be variable there is no certain way to fix a curing time. If one mixed cement dries too fast, the finally hardened mass tends to become crumbly and brittle. This makes for very unsatisfactory roads or building structures and the overall effect is that of a greatly weakened product due primarily to the rapid drying.

Because of these factors, the industry over a period of many years has sought to provide apparatus through the use of which efficient cooling of the fluidized finely divided particles of cement may be achieved, thereby to stabilize use.

It is important that such cooling apparatus, which necessarily is in the nature of a heat exchanger, shall be reasonably compact and efficient in order that the overall price of the marketed product shall not be unduly high. By similar analysis undue space requirements and expensive handling of the end-product shall be avoided.

The invention also provides increased operation of efficiency resulting from an ability in some of its forms for recirculating at least a portion of the pulverulent material as it moves and circulates through the chamber sections into which the cooling chamber is sectionalized. Improved fluidization of the pulverulent material in the upwardly flow sections aids in maintaining the cleanliness of the coolant plates and baffles and thus results in a greatly improved end-product.

This invention provides a structure for cooling or refrigerating finely divided solids in substantially a fluidized or puverulent condition so that the end-product removed from the cooling mechanism shall be easily handled and brought to a temperature generally most satisfactory for later utilization, particularly when utilization involves mixing with water. To achieve this objective, the present apparatus comprises the container or chamber unit into which the finely divided cement particles are introduced at approximately the temperature of removal from the clinker-grinding apparatus. The finely divided solid particles in a fluidized state are aerated to a fluidized state when introduced into the cooling mechanism. The aeration also makes it possible to effect a generally uniform flow rate of particles into and through the cooling mechanism.

Upon entering the cooling mechanism, the particles are caused to pass in a more or less serpentine path, downwardly and upwardly, across or adjacent to cooling plate areas constituting heat exchanger components. These plate areas absorb heat from the fluidized pulverulent mass and thereby cool it as it progresses through the unit. The mechanism comprises, generally, a series of baffles or cooling plates through which a liquid cooling medium is directed in a closed path. The fluidized cement mass is arranged to pass the heat exchanger components or baffles in one direction primarily under the influence of gravity and reduced aeration pressure at one portion of the cooling mechanism with respect to that pressure existing where the fluidized mass first contacts the baffle. Following a passage of the fluidized mass across the heat exchanger baffles in one direction a circulatory gaseous pressure (usually through an air-inlet under pressure) is applied to reverse the direction of flow of the pulverulent mass and thereby direct the flow upwardly or in the opposite direction to move across other heat exchanger components. This downward and upward circulation of the fluidized mass is repeated through a number of stages. Finally, following a selected number of passages of the material across the heat exchangers or the cooled baffles, the cooled material is ejected at an outlet port.

The circuitous path folowed by the fluidized particles permits a relatively long period of contact between the particles and certain of the heat exchanger baffle areas. It provides a particularly efficient method of withdrawing heat from the fluidized solids by absorbing that heat into the heat exchangers or baffle elements. The heat exchangers or baffle elements, generally in the form of a series of plate-like elements, are each of approximately a dimension corresponding to the width of the container or cooling chamber. They are arranged to divide the container into substantially a series of separate compartments. Each baffle or heat exchanger plate has tubular elements arranged therein so that a circulatory cooling medium can be passed therethrough.

Usually, because of the size of the components, the circulatory medium, which is preferably water, travels through each baffle in a general up-and-down serpentine-type path so that the heated and fluidized particles passing therethrough contact areas cooled by the circulation of the cooling fluid. Then, as the fluidized particles progress from compartment to compartment in the cooling apparatus, the temperature differential between the cooling liquid and the particles themselves gradually becomes less and less until at the point of ejection the desired amount of cooling has taken place. The cooling liquid can be introduced at any desired temperature and, if necessary, the liquid can be refrigerated to any desired extent in order that there shall be sufficient temperature difference between the inflowing fluid material and the coolant itself.

The coolant can pass through all of the heat exchanger plates in either parallel or series paths. A greater amount of cooling per square foot of cooling surface is obtained with a parallel arrangement but for conditions where economy of cooling water is of substantial importance, counter-current series flow may be preferred.

The apparatus by which the cooling is achieved has been diagrammatically illustrated in one of its preferred forms by the accompanying drawings, in which.

Figures 1, 4:
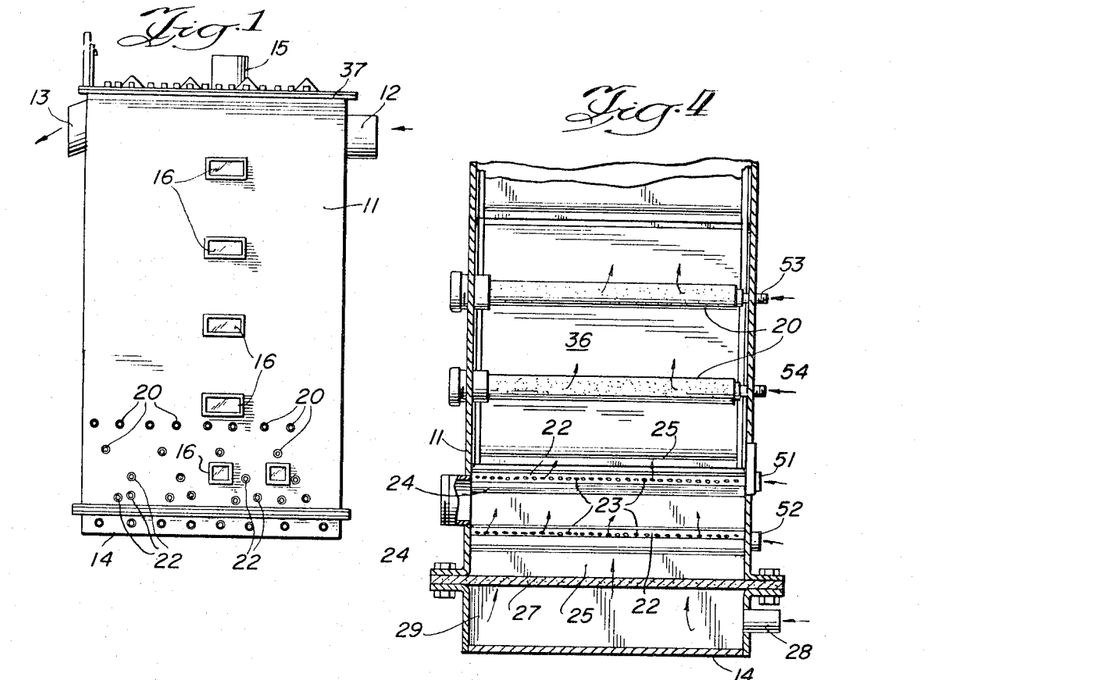
FIGURE 1 is a side elevation view of the general form of cooling device herein to be described.
FIGURE 4 is an enlarged view, partly in section, taken on the line 4—4 of FIGURE 3, looking in the direction of the arrows, to show a portion of the end of the cooling equipment.

Referring now to a preferred embodiment of the invention as illustrated by he accompanying drawings, the side elevational view of FIGURE 1 conventionally represents the cooling chamber 11. This chamber is a generally rectangular-shaped component into which the fluidized finely divided cement particles enter in the direction of the arrow through the conduit or inlet passage 12. As will be explained in what is to follow, the fluidized finely divided cement particles travel through the cooling chamber 11 in up-and-down paths adjacent the numerous baffle and heat exchanger plates or partitions. The particles after cooling are finally ejected through the outlet 13 in the direction shown by the arrow.

The cooled fluidized finely divided cement particles which pass from the cooling chamber through the outlet 13 are then supplied to any desired type of component, such as a truck or conveyor, or any other suitable means, which can transport the particles to a suitable place of storing or shipping. The cooling chamber 11 preferably is formed from metal sides firmly secured together in any desired fashion, none of which has been shown. Therefore, suffice it to say that the cooling chamber rests upon its base 14, which, in turn, is supported upon any suitable support form, such as floor or platform.

The upper portion of the chamber 11 includes a number of vent pipes, of which only a single one 15 is illustrated for reasons of convenience of showing.

Figure 3:
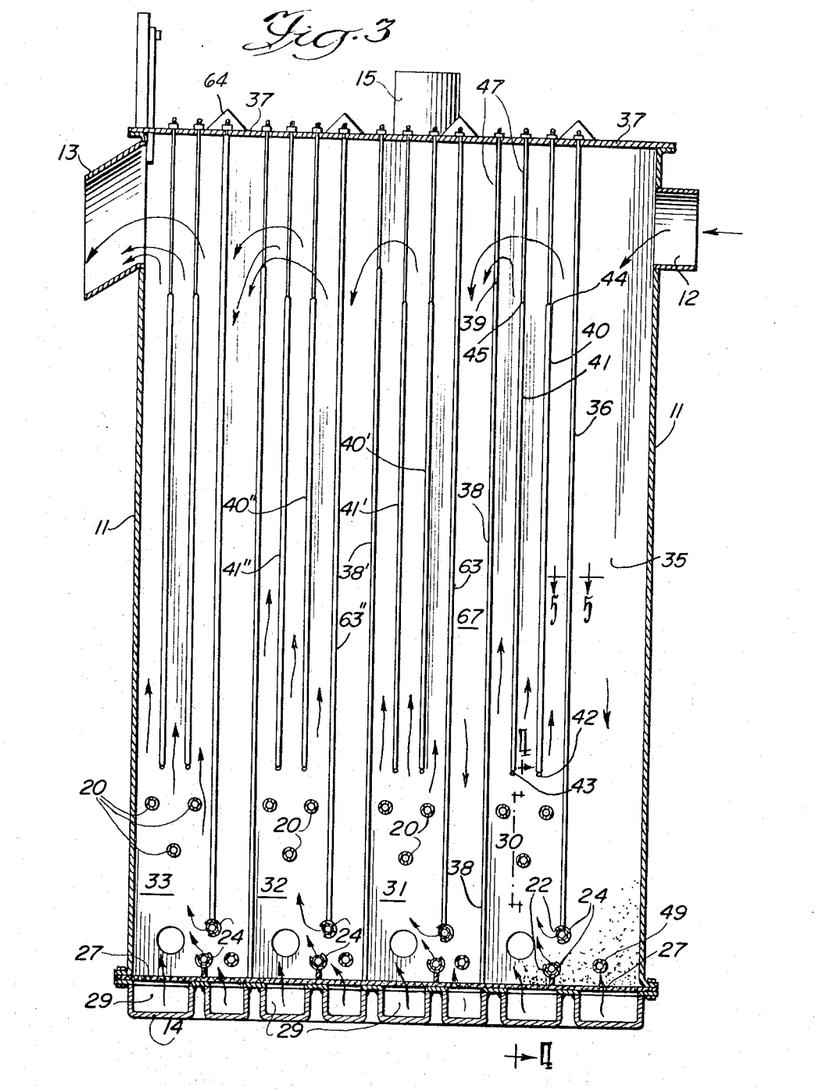
FIGURE 3 is an interior elevation view, partly in section, diagrammatically to represent the flow path of the fluidized cement particles and constitutes a view in side elevation taken substantially along the line 3—3 of FIGURE 2.

Normally, the cooling chamber is divided into several separate compartments, as will be particularly evident from the discussion of FIG. 3 to follow. It is usually preferable to provide an air vent in each of the compartments. Likewise, in the side wall of the chamber 11 a number of inspection ports or viewing windows 16 are shown. These are for the purpose of permitting ready inspection of the interior of the chamber, particularly during the cooling operation. In practice, it is frequently desirable to omit some of these inspection ports, so that the showing shall be here regarded as purely illustrative in nature.

Figure 7:
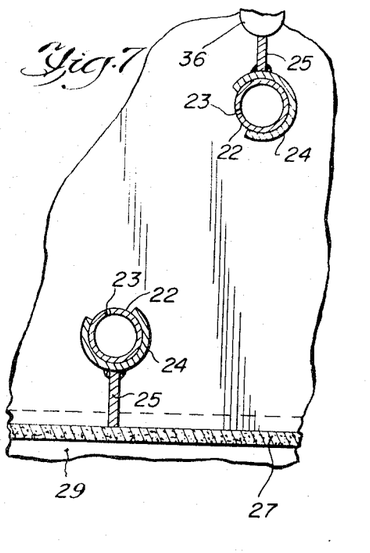
FIGURE 7 is an enlargement of the air inlet components to provide a circulating flow to direct the pulverized material between the baffles or heat exchangers.

A plurality of porous metal tubes, conventionally represented at 20, extend transversely through the chamber 11. These tubes are connected to be supplied with inlet air from a source operated under a limited pressure head, thereby to introduce a circulatory air flow within the complete component. In a region beneath the porous tubes 20, and laterally displaced from them, there is an additional series of tubes also directing air outwardly therefrom. These tubes are designated generically on the figures as tubes 22. For illustrative purposes, tubes 22 may be regarded as having a plurality of spaced and aligned openings 23 which extend longitudinally of the tube (in a direction transverse to the width of the chamber). The tubes 22 are held within a suitable support component 24, which is secured by welding, or otherwise, to a support bracket 25. The brackets are appropriately fastened into the side wall of the cooling chamber or to the end of certain selected baffle plates. In one form of the cooling device, the tubes 22 have air outlet holes each approximately 3/32-inch in diameter spaced longitudinally apart by about ½-inch, with holes being arranged in a single line only. The outer sheath covering 24 on the tubes 22 is preferably arranged with an open portion opposite the outlet holes or openings 23. The alignment is such that each inside tube is arranged to direct its outflowing air along a path or place such that for two adjacent tubes (see particularly FIG. 7) the openings are about 90° apart and the two outlet paths intersect at about the center of the section to which the tubes are adjacent, the reasons for which will be later explained.

Somewhat above the base 14 of the chamber, there is a layer 27 of air-permeable material through which air or other gas entering at the inlet tube 28 into the cavity 29 is adapted to pass to enter the cooling chamber proper. The entering air in the cavity 29 is at a pressure sufficient to preclude the fluidized cement entering at the inlet port 12 from settling at the bottom of the chamber 11. At the same time this air also provides an upward air flow toward the top of the chamber and the venting section.

If reference is made to FIG. 3 of the drawing, the interior of the chamber 11 will be seen to be divided into a plurality of separated sections, schematically designated as 30, 31, 32 and 33, with the intake cement entering from the inlet 12 into a still further separated section 35. The different sections of the chamber are separated by baffles or heat exchanger plates, the arrangement of which for adjacent sections is more particularly shown, illustratively, by FIGS. 3 and 8. Considering the right-hand region of FIG. 3, the fluidized finely divided solid particles of cement that enter at the inlet 12 are maintained within the section 35 by a baffle 36. The baffle or heat exchanger plate is secured to the topmost or cover portion 37 forming an upper closure for the chamber 11. It extends downwardly within the chamber to terminate some short distance above the air-permeable bottom section 27. The baffle or heat exchanger plate 36 is secured and rests upon the support element for the plate 25 (see FIG. 7) that holds the upper one of each of the tubes 22. The plate also seals the section and thereby prevents short-circuit of the material.

As can be seen, the baffle or heat exchanger plate 36 adjacent to the inlet 12 provides a separate section 35 within which all fluidized-entering finely divided cement particles follow a downward path toward the air-permeable or gas-permeable section 27. While the flow will be further discussed at a later point, may it here suffice to state that in the adjacent portion 30 of the cooling chamber there is a further baffle or heat exchanger plate 38 which separates the region 30 from the region 31 in a somewhat similar fashion. The baffle or heat exchanger plate 38, likewise, extends transversely of the chamber 11 and extends upwardly to an edge 39 which is approximately at the level of the lower portion of the inlet 12, although this level can vary somewhat. If desired, the level can be higher but then a correspondingly higher volume of higher pressure air will be required to convey the pulverulent material to the higher elevation.

Additional baffle or heat exchanger plates 40 and 41 (or more if desired) are supported between the heat exchanger baffle plates 36 and 38. These plates are hung or supported from the upper closure plate 37 and extend downwardly within the container and terminate with their edges 42 and 43, respectively (see particularly FIGS. 3 and 8), somewhat above the lowermost portion of the heat exchanger or baffle plate 36. At their upper edge the baffles or heat exchanger plates 40 and 41 terminate at edges 44 and 45, which are slightly below the terminating edge 39 of the baffle or heat exchanger plate 38. This tends to equalize the hydraulic pressures in all upward channels within the upward section.

Each of the baffles or heat exchanger plates 38, 40 and 41, like the plate 36, is hung from the cover member 37 but each is supported only at its outer edges by suitable rod-like members 47. These members can be the pipes to supply and remove cooling liquid from the plate coils of the heat exchanger or baffle plate 38. Each of the heat exchanger or baffle plates 38, however, extends to the lowermost surface of the chamber and to a region substantially adjacent to the air-permeable plate member 27. In the fashion explained, the entering-fluidized solid particles of cement first pass downwardly between the inner wall of the chamber 11 and the righthand wall of the heat exchanger plate or baffle 36 (looking at FIG. 3, for instance). After the fluidized cement material has passed downwardly to this extent and reaches substantially the lowermost portion of the section 35, it is subjected to a flow of air directed outwardly from the tube 49 in the general direction of the tubes 22 immediately to the left.

The tubes 22, which, as already explained, have a row of opening longitudinally arranged therein, direct an air flow derived from a source, illustratively, connected at the connections 51 and 52 in a direction such that the projected air paths cross or intersect interiorly of the section 30 along a plane slightly below that of the openings in the upper tube 22 and slightly above those in the lower tube 22. This action produces a suction effect in section 35 and a pressure effect in section 30. Conveyance of the pulverulent material through the cooler is thus facilitated. It is especially important and significantly beneficial when the materials are of such angular geometry and particle size distribution as to resist free flow. Under the section created by this air flow within the section 35, because of air being directed upwardly through the section 30, which air flow is aided by air flow passing outwardly through the porous tubes 20, the pulverulent material follows a similar path. Air is introduced into the tubes 20 by way of a pair of air inlet openings, schematically represented at 53 and 54. The air flow path in the upward direction, as aided by the flow due to tubes 22, toward the chamber cover is sufficient to force the pulverized cement particles upwardly. In so moving the pulverulent particles pass on each side of the heat exchangers or baffle plates 40 and 41 and on the right-hand side of the heat exchanger or baffle plate 38 and the left-hand side of the baffle or heat exchanger plate 36, all defining or included within the section 30. So moving, as can be seen particularly from the showings in FIGS. 3 and 8, the cement particles contact the heat exchanger plate or baffle walls through a substantial traverse distance.

Figure 5:
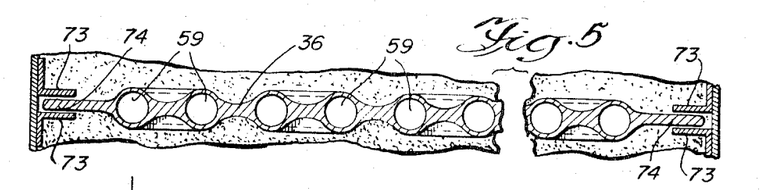
FIGURE 5 is a sectional view taken along the line 5—5 of FIGURE 3 to illustrate the flow path of the coolant through one of the heat exchanger baffles.
Figure 6:
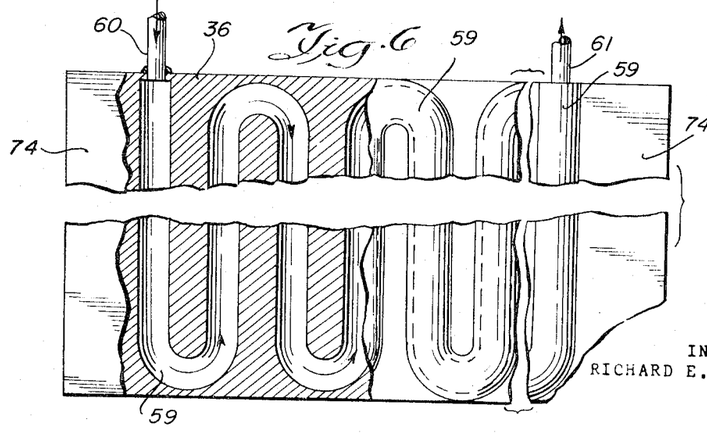
FIGURE 6 is a view, partly in section and also in elevation, looking at the baffle elements of FIGURE 5 and shows the flow path of the coolant therethrough.

For convenience of illustration, the baffle or heat exchanger plate, shown in FIGS. 5 and 6, is indicative of the surfaces contacted, illustratively, by the very finely pulverized particles first coming within the chamber 11 and moving in one direction adjacent to the plates. Secondly, the showing of the section limiting baffles or heat exchanger plates is indicative that the cement particles move in opposite directions when the baffle or heat exchanger plate is a boundary member.

The heat exchanger plate or baffle 36, like all others in the group has a tubular passageway 59 formed therein to provide a path through which a coolant liquid may flow. In the illustrated example, the liquid is adapted to enter into the tubular path 59 by way of an inlet tube 60 and to be withdrawn by way of an outlet tube 61. As can be seen particularly from FIG. 6, the tubular passageway 59 is a continuously reversing or of a generally serpentine configuration path, thereby to provide the greatest possible cooling effect on the plate. The continuous serpentine path is especially useful for directing the coolant through the baffle or heat exchanger plates. Nonetheless, other arrangements are clearly workable and may comprise, illustratively, tubes a parallel or tubes brought into headers at various regions, or zig-zag arrangements, or many others. The disclosure is, accordingly, illustrative of a useful and desired form.

Circulation of the coolant through the tube 59, of course, cools the metal plate 36 and at the same time contact of the finely pulverized cement or other mixture or material passing across the outer surface of the baffle or heat exchanger 36, tends to warm the plate and the coolant flowing through the tubular section 59 thereof. In well-known fashion, the temperature differential between the pulverized cement and the baffle or heat exchanger plate tends to cool the cement and warm the coolant withing the baffle or heat exchanger plate. Circulation of the coolant, however, is such that the replacement coolant entering at tube 60 is maintained in the coldest state while the removed coolant flowing out through the outlet 61 is in the warmest state.

The conditions obtaining in the remaining portions of the cooling device are generally similar to those already described. Therefore, suffice it to say that following circulation of the pulverized cement or other pulverized solid material particles upward through the section 30 to move over the edge 39 of the baffle or heat exchanger plate 38, the partially cooled cement particles then flow downwardly within the region 67 between the left-hand surface of the baffle 38 and the right-hand surface of the heat exchanger or baffle 63, which corresponds substantially to the baffle or heat exchanger 36. Then, upon reaching the lowermost portion of the baffle or heat exchanger 63, the suggested circulatory path, as heretofore explained, is generally repeated in the sections 31, 32 and 33.

Figure 2:
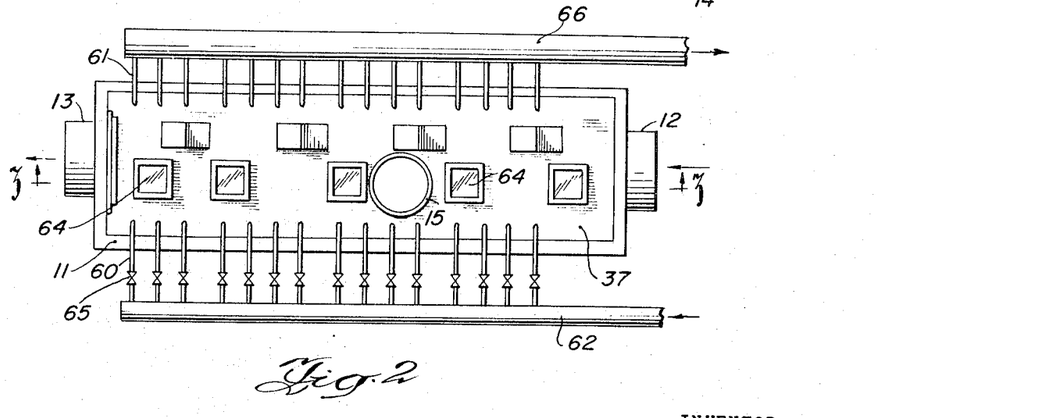
FIGURE 2 is a top view of the cooling device, showing particularly the manner in introducing and withdrawing the fluidized cement particles relative to the cooling medium.

For the purpose of understanding the invention and avoiding numerous repetitions of description, components heretofore discussed are marked with prime numbers within the section 31 and by double prime numbers within the section 32, and if numerically identified in the next adjacent section would be appropriately designated. Vents may be placed in the upper closure member, as desired. Likewise, inspection ports, as schematically illustrated particularly by the openings shown at 64 in FIG. 2, may be used, it being understood, of course, that the number of openings may be more or less than shown, as desired. The inlet path from which the various tubular passages 59 within the baffles receive the coolant, includes in the passage from the inlet manifold or header 62 to the tubular member 60 through an appropriate valve mechanism of any desired type as shown at 65, thereby to control the quantity of coolant supplied. The outlet tubes 61 feed into a maifold 66 from which the coolant is withdrawn following passage through the baffles, as shown.

Various types of components may be used throughout, but illustratively, the main body of the chamber 11 is formed from a rather heavy steel plate, usually about a ¼-inch thick. Similarily, the cooler top member 37 is formed from steel plate about the same thickness or slightly greater, due to the need to support the baffles. The side walls of the chamber on the top are secured in any desired fashion as by angle brackets or the like, thereby to provide a substantially tight and, if necessary, a welded chamber. The tubes 20 are preferably porous stainless steel tubing. This tubing is supported preferably by any desired form of coupling element, such as malleable iron.

While indeed the heat exchanger plates or baffles are held and supported from the top plate 37, the lateral edges of these plates are guided within flange elements 73, formed as U-shaped channels and secured to the side wall of the chamber. The outer edges, such as those schematically represented at 74, of each heat exchanger or baffle plate are then located within the U-shaped channel section, thereby to be positioned and held firmly against lateral force acting thereon. Normally, the heat exchanger or baffle plates are maintained by the guides 73 so as to be spaced a slight distance from the chamber wall, thereby to allow for ready withdrawal for cleaning and to provide for a reasonable amount of expansion during the cooling operation. Suitable tie rods, welded in place preferably, hold the lateral side members of the chamber rigidly with respect to each other and preclude relative movement.

Inlet coolant is usually provided through the inlet tube 63 which provides the header for the numerous connections made thereto from the cooling tubes within the various heat exchanger plates. Any suitable size tubing can be used for the inlet and outlet headers 63 and 66, although it has been found in one design that a 3-inch inlet tube is quite suitable, whereas a 4-inch outlet tube appears to provide the best end result. In another operation the cooling chamber may be so arranged that the vertical extent of the separating baffle or heat exchanger plates, such as 36, is approximately 10½ feet, in which event the short adjacent plates 40 and 41 may terminate at their lower edge about 2½ feet above the lowermost portion of the baffle 36. These plates preferably terminate in a plane about two feet from the cover plate 37 of the cooling chamber. This will contrast with the edge of the baffle plate, such as that shown at 38, which extends to the lowermost portion of the chamber and terminates about 1½ feet from the upper surface of the chamber. Normally, the spacing between the baffles 44 and 45, or between the baffles 44 and 36 or baffles 45 and 38, is about 3 inches, while the separation between the chamber wall 11 and the baffle 36 is preferably about one foot and the separation between the baffles 38 and 63 to form sections such as that shown at 67 is about 6 inches.

Many variations in these spacings and the like may be provided without in any respect changing the spirit or scope of the invention. Likewise, within the cooling chamber various lighting fixtures for determining the nature of the operation may be provided and preferably hung from the upper closure member 37 or closely adjacent thereto. The outer flow of the pulverized cement is in an upward direction between the chamber wall 11 (at the left of FIG. 3) and the interior baffles and the three interior baffles next adjacent thereto. Many and various modifications may be made in other components and it is to be understood that such changes may be resorted to where desired. From the standpoint of inlet pressure, it is customary in the operation of the cooling device herein described to provide air pressure on the inside of the pipes or tubes, as shown, which is in the region of about 5 to 10 p.s.i. blower pressure. The cement as it enters in the finely pulverized form of solids at the entrance port 12 is usually ground to a maximum size of about 44 microns, although, again, this is in no respect a limiting factor.

As has been pointed out above, any desired coolant can be assumed to be supplied through the manifold or header 62 so as to flow through the connecting passage 60 into the circulatory path 59 and then after completing the passage flow outwardly through the connecting member 61 to the outlet header 66. This provides a circuitous closed path for the coolant to flow within the baffle member. Positive cooling is insured in that the coolant flows relatively rapidly through the circuitous path 59 and, even though the temperature of the incoming pulverulent product is relatively high, the temperature change introduced into the coolant in the space between the entering connection 60 and outlet connection 61 is relatively low.

The herein described unit is normally connected to the supply conduit or inlet passage 12 immediately following a metal trap (not shown) on the feed side so that for selected conditions the trap can cut off the inflow of the pulverulent material which can then be diverted, as desired. Alternatively, a similar and suitable metal trap (not shown) may be provided in the described unit in the inlet section 35 in the region between the inlet 12 and the upper support component 24. For this purpose, there may then be provided a door opening in the wall 11 through which the trap diverts the supply.

Further, it will at once be apparent that the outer walls of the chamber 11 may be provided with passages therethrough in which coolant material may flow or that ducts or pipes through which a coolant flow may be supported adjacent to the inner surface of the container walls. So doing provides somewhat increased cooling area although it is not essential to the operation of the device.

Figure 9:
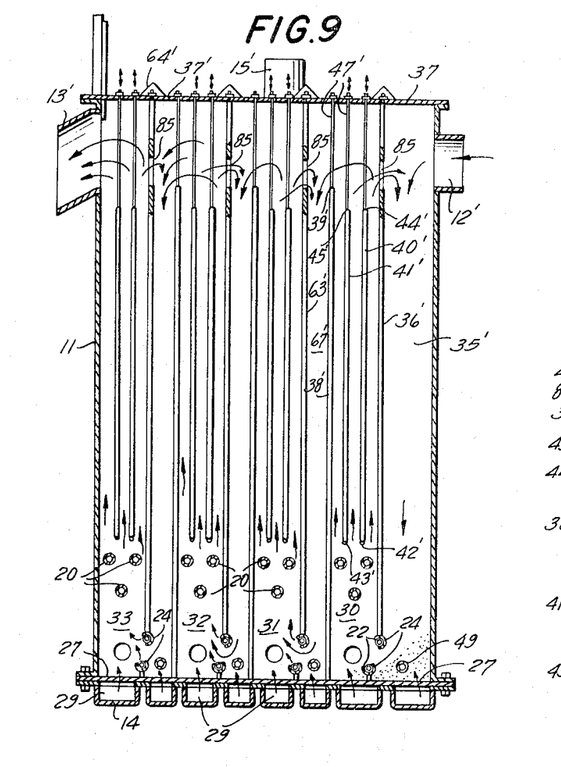
FIGURE 9 is a figure generally similar to FIGURE 3, particularly showing a feature of recirculation of the introduced cement.
Figure 10:
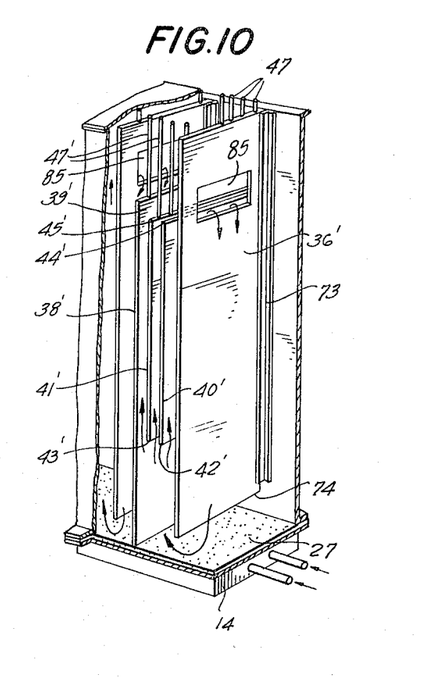
FIGURE 10 is a figure patterned in some respects after FIGURE 8 but showing further modifications of the baffle plates to permit ready recirculation of the pulverulent material so that pulverulent material moving upwardly can, at least in part, be recirculated and, at least in part, and particularly where loading is heavy, be caused to follow a serpentine path generally like that originally shown in FIGURES 1 and 8 in particular.

If reference is made particularly to FIGS. 9 and 10, specific reference has been shown for recirculating the pulverulent material. It has been found in the industrial use and application of the end-product that greatly improved results often result from what is known in the art as "back mixing."

Figure 8:
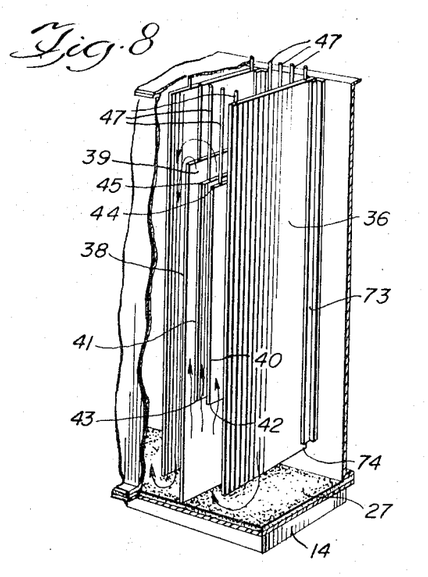
FIGURE 8 is an isometric view of a portion of the interior of the cooling chamber to show the general arrangement of the baffles or heat exchanger plate.

In such FIGS. as 9 and 10, for instance, (the prime numbers used generally replace numbers which may be compared with similar part numbering used in FIGS 3 and 8). Arrows are also used in channels where the material is flowing in an upward direction in multiple paths and only a single arrow is normally used when the material is flowing in a downward direction. Illustratively, the entering pulverulent material, such as the cement, enters through the conduit or inlet passage 12 or 12' and flows downwardly through sections 35 or 35'. By adjusting the baffles which divide the chamber into different compartments to different heights, it is possible to get a substantial number of back mixing combinations of material. For instance, it is possible to recirculate a portion of all of the material flowing upward in the first ⅓ of each upward channel or even the first ⅔ and thereby its increase in cooling efficiency because it keeps the material moving at an optimum linear velocity. This optimum linear velocity usually exceeds that which is required to convey the material through the machine. To reach such an optimum velocity, it is desirable to recirculate a portion of the pulverulent material back to a prior downward section and then permit it to continue around and around for more than one trip so to speak.

Many advantages flow from this plan because it permits the pulverulent solids to be truly fluidized in the upward flowing section rather than to be merely conveyed up and down between the baffles and at a relatively low linear velocity. The fluidization action and movement of the particle thus serves to increase substantially the cooling efficiency in such a cooling device.

As can be seen by referring particularly to FIGS. 9 and 10, the arrows of FIG. 9 are intended to represent and indicate a possible flow of pulverulent material going downward after leaving an upward flow section and again passing into a downward flow section. In many instances it is desirable that the initial baffle such as 36 or 36' against which the pulverulent material is first introduced, have a suitable opening schematically represented at 85 through which certain portions of the pulverulent material can flow back through another downward section. Where it is desired that certain other portions of the pulverulent material shall not entirely flow back it will be appreciated that the relative heights of the baffle members or heat exchanger plates 40 or 41 or 40' and 41' may be adjustable upwardly and downwardly relative to each other at least to a limited extent thereby better to control the flow. In this respect a baffle such as the baffle 36 or 36' may terminate (as seen in elevation in FIGS. 3 or 9 for instance) at an elevation below the designations 37 or 37' of the chamber. This provides a generally free passage of air or other gas all the way across and under the cover member of the chamber. In some instances, as can be seen particularly from FIG. 3, the vents 64 can be opened or closed to any extent desired. In either instance the in-flowing pulverulent material enters into the chamber and moves downwardly toward the chamber bottom which, as already explained, is porous and through which air or other gas may readily be passed.

The chamber size may be widely varied. Generally speaking one might visualize the action within the chamber as the cement cooler is operating much as one would consider that turbulence exists in a steam chamber of boiling water that is closed over the top but its vented in order that steam may escape. Like the boiling water in such a pot when gas bubbles flow through it the cement or other pulverulent material, the material remains in the cooler and the air or gas bubbles introduced through the porous bottom flow up and through it to an outlet.

During a generally normal operation a flow equilibrium is established. If the flow of the pulverulent material into the chamber is stopped for any reason, then the flow out also stops, but the level within the chamber remains approximately the same. It thus is apparent that the velocity and travel of the cement or other pulverulent material within the cooler may be determined by the original cooler design. As far as the actual size and geometry is concerned also this will control generally speaking the flow rate of the pulverulent material into the cooler and the cooling of the material as it passes over the baffles.

Figure 11:
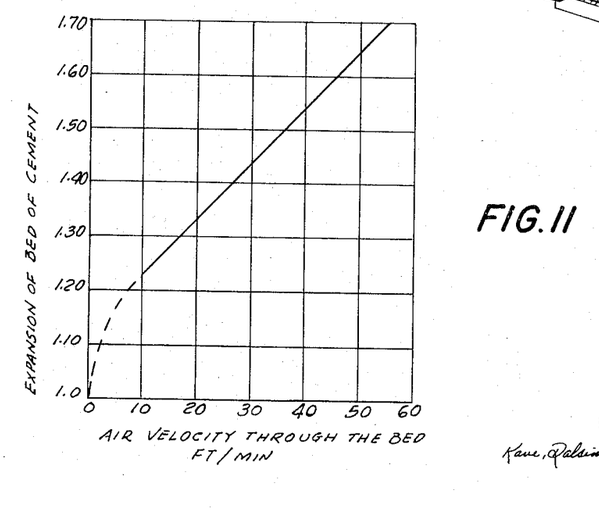
FIGURE 11 is a curve diagrammatic of the relationship of the expansion of the bed of cement (as for instance, the change in volume from the original) plotted against the air or fluid velocity in feet per minute in the fluid permeable base member.

If reference is made to FIG. 11 this feature is generally illustrated and explanation is apparent as to how the upward and downward flow sections operate. Reference to the curve of FIG. 11 also aids in the explanation of what occurs when back mixing and recirculation is practiced within the cooler.

If reference is made particularly to the graph of FIG. 11, it can be seen that at an air velocity of about 10'/minute through the porous bed of the cooler the bed depth is expanded to about 1.23 times the initial volume of the cement. The curve represents essentially the bed expansion of the Type I Portland cement, as compared to the air velocity through the bed of the cooling chamber. The expansion of the bed of cement as herein referred to represents generally speaking the change in volume from the original entering volume considering the conditions as outlined of the graph of FIG. 11 if an air flow rate of 50 feet per minute is considered it would be apparent that the bed of cement or the change in volume from the original has increased to approximately 1.63 times the original volume.

The high air or gas flow rate corresponds to the upward flow sections of the cooler as shown diagrammatically by the arrows in each section the bed of cement is expanded the most. Consequently, a cubic foot of cement in its more fluidized state weighs less than the cement in the downward flow section which, for instance, has a velocity as evident by the curve of about 10' per minute, and a bed expansion of about 1.23 times the original volume. The greater density in the downward flow section causes the cement readily to recirculate as it is moving through the cooling unit.

The cooling components for each of FIGS. 9 and 10 may be that as described in the remaining figures of the drawing and in the preceding description. It need not be discussed further again. In addition, the components shown by the tubes 22 with openings 23, as examplified particularly by the showing of FIG. 7, may be utilized in the same fashion with the recirculation process described in respect of FIGS. 9 and 10 and further explained with the aid of the curve and graphical analysis of FIG. 11. A curve similar to that shown by FIG. 11 may be illustrated. It may be found that the general pattern followed is closely related and need not be repeated. The cooler unit and chamber itself may vary in height and width as desired. Likewise, the inflow of air or gaseous material through the chamber bottom may be varied in accordance with modifications of the particular form of the described air permeable or porous bottom section. The mounting of the baffles relative to each other and to the supporting top member may be changed widely as desired. No specific size limitations are essential and the general pattern will be maintained throughout.

The cooling device, as here described, provides through the geometry of the selected paths an extremely compact cooling medium. High operational efficiency, together with substantial reduction in fabrication costs and space requirements, is insured through the structural arrangement of the cooling baffles. The paths through which the pulverulent material flows are optimally fixed to minimize channelling and useless dead space. Further, the arrangement of the various circulatory paths, together with the baffles through which the coolant flows, is such that the inlet passage 12 may be located relative to other components with a wide degree of choice. With substantially equal operational efficiency, the inlet 12, through which the pulverulent material is introduced into the cooling chamber, may be at any selected height so that it is either above or below the height at which the cooled outlet material is ejected. This feature, in many instances, is quite advantageous in the freedom of overall plant design.

Other advantages and modifications will readily suggest themselves to those skilled in the art to which the invention is directed.

Having now described the invention, what is claimed is:

1. Apparatus for processing substantially dry pulverulent material comprising a substantially closed chamber having top, side and bottom closure members and having therein compartment means provided with inlet and outlet ports, the inlet port being located in a wall portion of the chamber through which the pulverulent material introduced therein tends to settle gravitationally, comprising a plurality of substantially parallelly positioned baffle means within the chamber and extending transversely between two opposite side members to form compartment means and to guide the flow of material therethrough, the first baffle means approximately adjacent to the inlet extending downwardly from the chamber top toward the chamber bottom and terminating with a spacing from the chamber bottom sufficient to provide a passageway for material around the bottom of the baffle, a second baffle means also extending transversely between the said two opposite side members to form a side closure member for the compartment on the side of the first-named baffle remote from the inlet port, means for supporting the second-named baffle from the chamber bottom and extending said baffle upwardly therefrom toward the chamber top generally opposite the inlet port to the chamber, the chamber bottom including an air-permeable surface means through which an air flow is adapted to be directed through the air-permeable bottom into the compartment with the flow directed in an upwardly direction, a plurality of the porous tube means in the compartment region between the first- and second-named baffles and located generally near and above the lowermost point of the first-named baffle means, means to introduce air into the said porous members to provide an upward air flow toward the upper portion of the compartment region between the first- and second-named baffles, thereby to reinforce the circulation path and substantially to prevent material adherence upon the baffle surfaces, and means for introducing a circulating coolant internally of the baffle means thereby to cool the pulverulent material in its passage adjacent to the baffle means.

2. The apparatus claimed in claim 1 comprising, in addition, a plurality of compartments adjacent to said first-named compartment arranged successively to receive pulverulent material from one adjacent compartment and to discharge the material after circulation into the next adjacent compartment, the circulating path of material being substantially serpentine whereby material circulates successively through each compartment and is cooled during such passage.

3. Apparatus for processing substantially dry pulverulent material comprising a substantially closed chamber having top, side and bottom closure members and having therein compartment means provided with inlet and outlet ports, the inlet port being located in a wall portion of the chamber through which the pulverulent material is introduced therein so that it tends to settle gravitationally, comprising a plurality of substantially parallelly positioned baffle means within the chamber to form compartment means and to guide the flow of material therethrough, the first baffle means being substantially adjacent to the material inlet and extending generally downwardly from the chamber top to its bottom and terminating with a spacing from the chamber bottom sufficient to provide a passageway for material around the baffle, a second baffle element forming a side closure member for the compartment on the side of the first-named baffle remote from the inlet port, means for supporting the second-named baffle from the chamber bottom and extending said baffle upwardly therefrom toward the chamber top to a region substantially opposite the inlet port to the chamber, an air-permeable means at the bottom of the chamber to direct an air flow into the compartment with the flow directed in an upwardly direction, means supported in the compartment region between the first- and second-named baffles and located generally near and above the lowermost point of the first-named baffle means to introduce air into the compartment to provide an upward air flow towards its upper portion in the passage provided between the first- and second-named baffles, thereby to reinforce the circulation path and substantially to prevent material adherence upon the baffle surfaces and means for introducing a circulating coolant internally of the baffle means thereby to cool the pulverulent material in its passage adjacent to the baffle means as provided by the air flow.

4. Apparatus for processing substantially dry pulverulent material comprising a substantially closed chamber having top, side and bottom closure members and having therein a plurality of compartment means each provided with inlet and outlet ports, the inlet port being located in a wall portion of the chamber so that the introduced pulverulent material tends to settle gravitationally within the compartment, comprising a plurality of substantially parallelly positioned baffle means within the chamber to form the compartments and to guide the flow of material therethrough, the first baffle means being substantially adjacent to the inlet port and extending between the chamber top and bottom downwardly toward the chamber bottom with a spacing from the chamber bottom providing a passageway for material around the baffle, a second baffle element forming a side closure member for the compartment on the side of the first-named baffle remote from the inlet port, the compartment having its outer sides formed from the chamber wall and the second baffle, means for supporting the second-named baffle from the chamber bottom and extending said baffle upwardly therefrom toward the chamber top, at least one additional baffle means positioned in the space between the first two said baffle means and extending parallelly thereto and terminating above the lowermost point of the first baffle means and below the uppermost point of the second baffle means, an air permeable means at the bottom of the chamber to direct an air flow through the bottom and into the compartment with the flow directed in an upwardly direction, a plurality of porous tube means in the compartment region between the first- and second-named baffles and located above the lowermost point of the first-named baffle means and below the additional baffle means, means to introduce air into the said porous members to provide an upward air flow toward the upper portion of the compartment region between the first- and second-named baffles, and means for introducing a circulating coolant internally of the baffle means thereby to cool the pulverulent material in its passage adjacent to the baffle means.

5. The apparatus claimed in claim 4 comprising, in addition, a plurality of air jets for introducing air under pressure into the compartment, one of said jets being supported substantially coplanar to the bottom of the compartment baffle which terminates above the chamber bottom, the second of said jets being supported substantially from the chamber bottom, the said jets being turned to direct an outward flow of air in separate planes intersecting in the region between the first- and second-named baffle elements thereby to create a suction effect within the chamber in the region between the side member through which material is introduced and its adjacent baffle and to create a pressure effect within the compartment region separating the first- and second-named baffles.

6. The apparatus claimed in claim 5 comprising in addition, a plurality of compartments adjacent to said first-named compartment arranged successively to receive pulverulent material from one adjacent compartment and to discharge the material after circulation into the next adjacent compartment, the circulating path of material being substantially serpentine whereby material circulates successively through each compartment and is cooled during such passage.

7. Apparatus for processing substantially dry pulverulent material comprising a substantially closed chamber having top, side and bottom closure members and having therein compartment means provided with inlet and outlet ports, the inlet port being located in a wall portion of the chamber wall from which the pulverulent material introduced therein tends to settle gravitationally within the compartment, comprising a plurality of baffle means positioned substantially parallelly to the chamber wall in which the inlet is provided, the baffles dividing the chamber into compartments and serving to guide the flow of material therethrough, the chamber wall having the inlet port formed in one compartment wall, the baffle means adjacent to the inlet port extending upwardly to substantially the chamber top and downwardly toward the chamber bottom with the spacing therefrom providing a passageway for the movement of material around the baffle, a second baffle element forming the second side closure member for the compartment on the side of the first-named baffle remote from the inlet port, means for supporting the second-named baffle from the chamber bottom and extending said baffle upwardly therefrom toward the chamber top, at least one additional baffle means positioned in the space between the first two said baffle means and extending parallelly thereto and terminating above the lowermost point of the first baffle means and below the uppermost point of the second baffle means, an additional plurality of baffles alternating with the first and second baffles and similarly supported to provide additional adjacent compartments, an air permeable means at the bottom of the chamber to direct an air flow through the bottom and into each compartment volume with the flow directed in an upwardly direction, a plurality of the porous tube means in each compartment region between the first- and second-named baffles and located near the lowermost point of the first-named baffle means and above the bottom of the baffle adjacent to the inlet port, means to introduce air into the said porous members to provide an upward air flow toward the upper portion of the compartment region between the first- and second-named baffles to aid in circulation of moving material and to limit adherence of the material to the baffle wall, and means for introducing a circulating coolant internally of the baffle means thereby to cool the pulverulent material in its passage adjacent to the baffle means, and means to remove the pulverulent material from the chamber.

8. The apparatus for processing substantially dry pulverulent material, as claimed in claim 7, wherein the baffle means forming the compartment sides each have included therein and between the baffle walls a coolant-conducting passage adapted to follow a substantially serpentine path transversely of the baffle in one direction, and wherein the means for introducing and removing coolant internally of the baffles comprises a first header means for introducing coolant and a second header means to withdraw the coolant from the baffles, and means to connect the baffles to the header means whereby coolant flowing in the inlet header means is directed through the passage within the baffle thereby to provide a closed coolant path and supply positive cooling action on pulverluent material circulated thereacross and whereby the circulated coolant is removed from the baffle means.

9. The apparatus claimed in claim 7 comprising, in addition, a plurality of air jets for introducing air under pressure into the compartment, one of said jets being supported substantially coplanar to the bottom of the compartment baffle which terminates in spaced relationship to the chamber bottom, the second of said jets being supported substantially from the chamber bottom, the said jets being turned to direct an outward flow of air in separate planes intersecting in the region between the first- and second-named baffle elements thereby to create a suction effect within the chamber in the region between the side member through which material is introduced and its adjacent baffle and to create a pressure effect within the compartment region separating the first- and second-named baffles.

10. Apparatus for processing substantially dry pulverulent material comprising a substantially closed chamber having top, side and bottom closure members and having therein compartment means provided with inlet and outlet ports, the inlet port being located to permit introduction of the pulverulent material into the chamber so that it tends to settle within the chamber gravitationally, a plurality of substantially parallelly positioned baffle elements within the chamber to compartmentize the chamber into sections in which the pulverulent material flows downwardly along one path and upward along another path to guide the flow of material therethrough, a porous fluid permeable bottom portion for the chamber adapted to have fluid introduced therein under pressure so that material introduced at the inlet and extending downwardly therefrom toward the chamber bottom is recirculated toward the chamber top, a second baffle means forming a side closure section for the compartment on the side of the first named baffle remote from the inlet passage for confining the recirculated material to a separate path, means for supporting the second named baffle means from the chamber bottom and extending the said baffle means upwardly therefrom toward the chamber top to a terminating plane substantially at the height at the entrance port, at least one additional downwardly extending baffle member extending from the top toward the bottom to direct pulverulent material downwardly toward the chamber bottom and additional similar upwardly extending baffle means also supported in the chamber to form the chamber into additional compartments, the additional upwardly extending baffles likewise extending to heights toward the top substantially corresponding to the height of the first named upwardly extending baffle, means provided by the inward fluid flow through the bottom member for creating a greater pressure on the introduced pulverulent material in the upward direction than that effective in the downward direction, whereby introduced pulverulent material is adapted to follow a generally serpentine path through the chamber with at least a portion of the upwardly circulating pulverulent material being directed backwardly toward the path of the downwardly moving pulverulent material thereby to recirculate the pulverulent material from compartment to compartment, and means for introducing a coolant into at least a portion of the baffle members to cool moving pulverulent material during its movement through the compartments thereby to improve fluidization of the pulverulent material during its movement upwardly between different baffle sections.

11. The apparatus claimed in claim 10 and comprising, in addition, porous tube means in the lower portion of the compartments and spaced from the bottom for providing an upright fluid flow for moving the pulverulent material upwardly.

12. Apparatus for processing substantially dry pulverulent material comprising a substantially closed chamber having top, side and bottom closure members and having therein compartment means provided with inlet and outlet ports, the inlet port being located to permit introduction of the pulverulent material into the chamber so that it tends to settle within the chamber gravitationally, a plurality of substantially parallelly positioned baffle elements within the chamber to compartmentize the chamber into sections in which the pulverulent material flows downward and upward and to guide the flow of material therethrough, a porous fluid-permeable bottom portion for the chamber, means to introduce a fluid flow under pressure into the chamber through the porous bottom, the first baffle means being substantially adjacent to the material inlet and extending downwardly from the inlet area toward the chamber bottom and terminating at a region above the chamber bottom at a distance sufficient to provide a passage way around the bottom of the baffle and the porous fluid-permeable bottom, additional baffle means forming a side closure member for the compartment on the side of the first-named baffle remote from the inlet passage means for supporting the second-named baffle from the chamber bottom and extending the said baffle upwardly therefrom toward the chamber top, at least a portion of the baffle terminating in a plane substantially at the height of the entrance port, at least one additional downwardly extending baffle member extending from the top toward the bottom to direct pulverulent material downwardly toward the chamber bottom and additional similar upwardly extending baffle members supported in the chamber bottom to form the chamber into additional compartments, the additional upwardly extending baffles likewise extending to heights toward the top substantially corresponding to the height of the first named upwardly extending baffles, means provided by the inward fluid flow through the fluid-permeable bottom member for creating a greater pressure on the introduced pulverulent material in the upward direction than is effective in the downward direction whereby introduced pulverulent material is adapted to follow a generally serpentine path through the chamber with at least a portion of the upwardly circulating pulverulent material being directed backwardly toward the path of the downwardly moving pulverulent material, thereby to recirculate the pulverulent material from compartment to compartment, and means for introducing into the baffle members a coolant to cool moving pulverulent material during its movement through the compartments thereby to improve fluidization of the pulverulent material during its movement upwardly between different baffle sections.

13. The apparatus claimed in claim 12 and comprising, in addition, porous tube means in the lower portion of the compartments for providing an upward gaseous flow for moving the pulverulent material upwardly.

14. The apparatus claimed in claim 13 and comprising, in addition, porous tube means in the lower portion of the compartments for providing a supplemental upward fluid flow for moving the pulverulent material and assisting in its fluidization.

References Cited

UNITED STATES PATENTS

| | | | |
|---|---|---|---|
| 2,797,908 | 7/1957 | Zubrzycki | 34—57 |
| 3,031,769 | 5/1962 | Wilson | 34—57 |
| 3,070,970 | 1/1963 | Zager et al. | 34—10 X |

FREDERICK L. MATTESON, JR., *Primary Examiner.*

J. J. CAMBY, *Assistant Examiner.*